United States Patent Office 3,803,217
Patented Apr. 9, 1974

3,803,217
ESTER INTERMEDIATES FOR PRODUCING POLYENE COMPOUNDS
Ulrich Schwieter, 8 Im Pfeiffengarten, Reinach, Basel-Land, Switzerland, and Norbert Rigassi, 3 Gehrenmattstrasse, Arlesheim, Switzerland
No Drawing. Original application June 18, 1970, Ser. No. 47,572. Divided and this application Mar. 19, 1973, Ser. No. 342,576
Claims priority, application Switzerland, July 4, 1969, 10,221/69
Int. Cl. C07c 69/14, 69/62, 69/78, 70/46
U.S. Cl. 260—488 R     2 Claims

ABSTRACT OF THE DISCLOSURE

A process for producing 3-methyl-5-(1-hydroxy-2,6,6-trimethyl - 4 - oxo-cyclohex-2-en-1-yl)-penta-2,4-dien-1-oic acid, derivatives thereof and related compounds which are useful as plant growth regulators, from 4-(1,2-epoxy-2,6,6-trimethyl-cyclohex-3-en-1-yl)-but-3-en-2-one or 3-methyl - 5 - (1,2-epoxy-2,6,6-trimethyl-cyclohex-3-en-1-yl)-penta-2,4-dienyl derivatives including intermediates in this process.

This is a division, of application Ser. No. 47,572 filed June 18, 1970.

BACKGROUND OF THE INVENTION

In the past 1-hydroxy-2,6,6-trimethyl-4-oxo-cyclohexene compounds have been manufactured with difficulty and in poor yields. For example, 4-(1-hydroxy-2,6,6-trimethyl - 4 - oxo-cyclohex-2-en-1-yl)-but-3-en-2-one [6-hydroxy-3-keto-α-ionone] has been prepared by oxidizing 4 - (2,6,6-trimethyl-cyclohex-2-en-1-yl)-but-3-en-2-one [α-ionone] with t-butyl chromate or chromic acid. This oxidation has only produced the desired 6-hydroxy-3-keto-α-ionone in poor yields. Furthermore, the 6-hydroxy-3-keto-α-ionone obtained by this process has been difficult to isolate in pure form.

Additionally, the known plant growth regulator, abscisic acid, [3-methyl-5-(1-hydroxy-2,6,6-trimethyl-4-oxo-cyclohex-2-en-1-yl)-penta-2-cis,4-trans-dien - 1 - oic acid] has in the past been prepared by first converting 3-methyl-5-(2,6,6-trimethyl-cyclohexa - 1,3 - dien - 1 - yl)-penta-2,4-dien-1-oic acid into 3-methyl-5(1,4-epidioxy-2, 6,6-trimethylcyclohex-2-en-1-yl)penta-2,4-dienoic acid by photochemical oxidation, then opening the endoperoxide with a base and thereafter separating the desired 2-cis isomer from the 2-cis/trans isomeric mixture. This process suffers from the disadvantage that it produces abscisic acid in poor yields and that extensive purification of the abscisic acid produced by this process is necessary.

SUMMARY OF THE INVENTION

In accordance with this invention it has been found that compounds of the formula

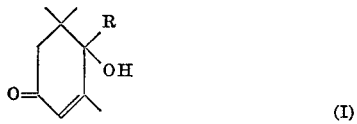

(I)

wherein R is

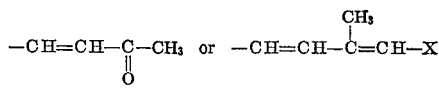

X is hydroxymethylene, formyl, cyano, carboxy, lower alkoxycarbonyl, lower alkanoyl, phenoxycarbonyl, phenoxycarbonyl substituted with at least one member selected from the group consisting of nitro, lower alkyl, halo lower alkyl, or lower alkylsulfonyl, benzoyl, ben- zoyl substituted with at least one member selected from the group consisting of lower alkyl, nitro, halo lower alkyl or lower alkylsulfonyl, or

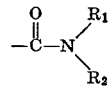

and R₁ and R₂ are individually hydrogen, lower alkyl or phenyl or taken together with their attached nitrogen atom form an imidazole ring can be obtained in high yields and with a high degree of purity in a simple manner by first reacting a compound of the formula

(II)

wherein R' is

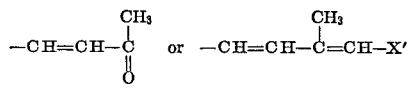

wherein X' is etherified or esterified hydroxymethylene, formyl, cyano, carboxy, lower alkoxycarbonyl, lower alkanoyl, phenoxycarbonyl, phenoxycarbonyl substituted with at least one member selected from the group consisting of nitro, lower alkyl, halo lower alkyl, or lower alkylsulfonyl, benzoyl, benzoyl substituted with at least one member selected from the group consisting of lower alkyl, nitro, halo lower alkyl or lower alkylsulfonyl or

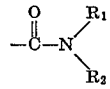

and R₁ and R₂ are individually hydrogen, lower alkyl or phenyl or taken together with their attached nitrogen form an imidazole ring with selenium dioxide and then oxidizing the resulting 1,4-diol. If the compound of Formula I is formed where X' is an etherified or esterified hydroxymethylene group; this group can be hydrolized to form the corresponding alcohol. If the compound of Formula I above is formed where X' is an esterified acid group, these esters can, if desired, be saponified and, if desired, the resulting acid converted into an amide or an ester.

In accordance with this invention, the above process provides a simple and economic means for producing the known plant hormones such as abscisic acid, abscisic acid derivatives and related compounds as illustrated by Formula I above.

The compounds of Formula I are useful as plant growth regulatory agents.

Among the preferred compounds of Formula I produced by this invention are the following:

4-(1-hydroxy-2,6,6-trimethyl-4-oxo-cyclohex-2-en-1-yl)-but-3-en-2-one [6-hydroxy-3-keto-α-ionone];
3-methyl-5-(1-hydroxy-2,6,6-trimethyl-4-oxo-cyclohex-2-en-1-yl)-penta-2-cis,4-trans-dien-1-oic acid [abscisin];
3-methyl-5-(1-hydroxy-2,6,6-trimethyl-4-oxo-cyclohex-2-en-1-yl)-penta-2-cis/trans, 4-trans-dien-1-oic acid ethyl ester;
3-methyl-5-(1-hydroxy-2,6,6-trimethyl-4-oxo-cyclohex-2-en-1-yl)-penta-2,4-dien-1-oic acid methyl ester;
3-methyl-5-(1-hydroxy-2,6,6-trimethyl-4-oxo-cyclohex-2-en-1-yl)-penta-2,4-dien-1-oic acid n-pentyl ester;
3-methyl-5-(1-hydroxy-2,6,6-trimethyl-4-oxo-cyclohex-2-en-1-yl)-penta-2,4-dien-1-oic acid phenyl ester;

3-methyl-5-(1-hydroxy-2,6,6-trimethyl-4-oxo-cyclohex-2-en-1-yl)-penta-2,4-dien-1-oic acid p-nitrophenyl ester;
3-methyl-5-(1-hydroxy-2,6,6-trimethyl-4-oxo-cyclohex-2-en-1-yl)-penta-2,4-dien-1-oic acid p-methylsulphonylphenyl ester;
3-methyl-5-(1-hydroxy-2,6,6-trimethyl-4-oxo-cyclohex-2-en-1-yl)-penta-2,4-dien-1-oic acid nitrile;
1-benzoyl-3-methyl-5-(1-hydroxy-2,6,6-trimethyl-4-oxo-cyclohex-2-en-1-yl)-penta-2,4-diene; and
3-methyl-5-(1-hydroxy-2,6,6-trimethyl-4-oxo-cyclohex-2-ene-1-yl)-penta-2,4-dien-1-oic acid imidazolide.

DETAILED DESCRIPTION OF THE INVENTION

The term "halogen" as used throughout this application includes all four halogens, i.e., bromine, chlorine, fluorine and iodine, if not otherwise indicated. As used throughout this application, the term "lower alkyl" comprehends both straight and branched chain saturated hydrocarbon groups containing from 1 to 6 carbon atoms, such as methyl, ethyl, propyl, isopropyl, etc. The term "lower alkoxy" comprehends lower alkoxy groups containing from 1 to 6 carbon atoms such as methoxy, propoxy, ethoxy, etc.

The term "lower alkanoyl" as utilized throughout this specification includes lower alkanoyl groups containing from 1 to 6 carbon atoms preferably 1 to 5 carbon atoms. Among the preferred lower alkanoyl groups are included acetyl, propionyl, pivaloyl.

The term "lower alkoxycarbonyl groups" includes groups wherein lower alkoxy is defined as above. The preferred lower alkoxycarbonyl groups are those groups wherein the lower alkoxy substituent contains from 1 to 5 carbon atoms, such as methoxycarbonyl, ethoxycarbonyl, propoxycarbonyl, isopropoxycarbonyl, butoxycarbonyl or pentoxycarbonyl.

The lower alkyl residue, the lower halo alkyl residues, and the lower alkyl sulfonyl residues which can be substituted on the phenyl substituent can contain from 1 through 6 carbon atoms, preferably from 1 to 4 carbon atoms. The halo lower alkyl residue can be monohalo-substituted, dihalo-substituted or trihalo-substituted. Among the preferred halo alkyl residues are included chloromethyl, dichloromethyl, and trifluoromethyl. Among the lower alkyl sulfonyl residues are included, methyl sulfonyl, and ethyl sulfonyl.

The carbamyl group can be mono-substituted or di-substituted by lower alkyl. Among the preferred lower alkyl substituted carbamyl groups are those wherein the lower alkyl substituent contains from 1 to 4 carbon atoms. Among such groups are included methyl carbamyl, N,N-dimethyl carbamyl, ethyl carbamyl and N,N-diethyl carbamyl.

The X' in the compound of Formula II above is an etherified or esterified hydroxymethylene group, the hydroxymethylene group can be etherified with a lower alkyl or aryl substituent. On the other hand, the hydroxymethylene group can be esterified with a lower alkanoyloxy or aryloxy group. The term "aryl" as used throughout the application includes mono-nuclear aryl groups such as phenyl which can be unsubstituted or substituted in one or more positions with lower alkyl, halogen or nitro. The term "aryl" also includes polynuclear aryl groups, such as naphthyl, anthryl, and phenanthryl, azulyl, etc. which may be unsubstituted or substituted with one or more of the aforementioned groups. The preferred polynuclear aryl group is naphthyl.

The compounds of Formula I are hormones for promoting the abscission or shedding of the fruit from a plant and for regulating the growth of plants. The compounds of Formula I are growth regulators for mono and dicotyledonous plants. Furthermore, because of their low toxicity these compounds also can be used as herbicides. The compounds of Formula I are preferably employed in the cultivation of sugar cane. By applying these compounds to sugar cane, the sugar content of the sugar cane can be enhanced since these compounds inhibit the growth of the shoots.

The compounds of Formula I where R is

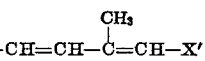

wherein X' is as above
have the formula

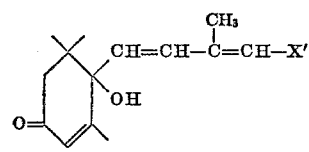

I-A wherein X' is as above

The compounds of Formula I-A can be produced from compounds of the formula

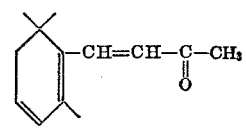

(V)

by the following reaction scheme:

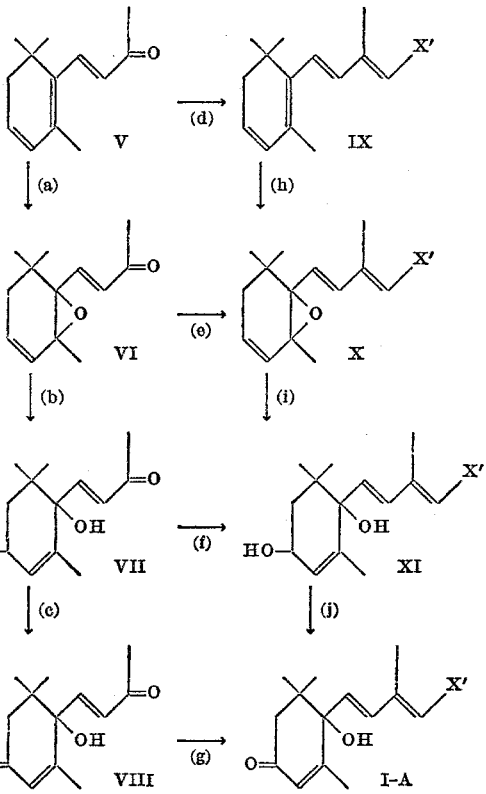

wherein X' is as above

The compound of Formula V can be converted to the compound of Formula VI, by a reaction step (a) by treating the compound of Formula V with an organic peracid. In carrying out this reaction, any conventional organic peracid can be utilized. Among the conventional organic peracids which can be utilized, performic acid, peracetic acid, perbenzoic acid, m-chloro-perbenzoic acid and perphthalic acid are preferred. Generally, this reaction is carried out in the presence of an inert organic solvent. Any conventional inert organic solvent can be utilized in carrying out this reaction. Among the preferred inert organic solvents, the halogenated hydrocarbon solvents such as methylene chloride are preferred. In carrying out this reaction, temperatures of from −10° C. to room temperature are generally utilized. Generally, it is preferred to utilize temperatures of about 0° C. in carrying out this reaction.

By the process of step (a), 4-(2,6,6-trimethyl-cyclohexa-1,3-diene)-but-3-en-2-one[dehydro-β-ionone] is converted to 4-(1,2-epoxy-2,6,6-trimethyl-cyclohex-3-en-1-yl)-but-3-en-2-one[5,6-epoxy-dehydro-β-ionone].

The compound of Formula VI can be converted to the compound of Formula VII, via reaction step (b) by treating the compound of Formula VI with selenium dioxide. The epoxide of Formula VI and selenium dioxide can, if desired, be employed in equal molar amounts. However, it has been found to be expedient to use the selenium dioxide in a molar excess of the amount of the compound of Formula VI. Generally, it is preferred to use about 1 mole to about 2 moles of selenium dioxide per mole of the compound of Formula VI in carrying out the reaction of step (b). The reaction of step (b) is carried out preferably in an organic solvent. Any conventional organic solvent can be utilized. Among the preferred organic solvents are included tetrahydrofuran, dioxane, diethyl ether, hexane, benzene, etc. with tetrahydrofuran being especially preferred.

The selenium dioxide, which exists as a solid at room temperature, is advantageously utilized in a finely divided form, especially in a pulverized form. In carrying out the reaction of step (b), temperature and pressure are not critical and the reaction can be carried out at room temperature and atmospheric pressure. However, if desired, elevated or reduced temperatures can be utilized. Generally, it is preferred to carry out this reaction at a temperature of from 0° C. to the boiling point of the reaction mixture. Depending upon the chosen reaction temperature, from about 12 to 60 hours are sufficient to carry out the reaction of step (b).

The compound of Formula VII can be isolated from the reaction mixture of step (b) by the conventional means. These means included extracting with a solvent (particularly diethylether), washing the extract with dilute alkali, drying and thereafter evaporating the ether solvent. The compound of Formula VII can, if desired, be purified by conventional means such as adsorption on Kieselgel and elution with a solvent mixture, such as hexane and ethyl acetate. On the other hand, the crude compound of Formula VII can be oxidized to the compound of Formula VIII.

The oxidation of either the pure or crude compound of Formula VII to the compound of Formula VIII can be carried out by use of various oxidizing agents. Among the preferred oxidizing agents are included chromium or sulfur trioxide and pyridine, manganese dioxide, chromisulfuric acid, dimethylsulfoxide or N-bromo lower alkanoyl amides. Among the preferred N-bromo lower alkanoyl amides, N-bromoacetamide, is especially preferred. In carrying out this reaction any of the conventional conditions utilized in carrying out oxidation reactions with these oxidizing agents can be utilized.

From the aforementioned agents, chromisulfuric acid is generally preferred. In utilizing this oxidizing agent, one expediently uses a chromisulfuric acid solution prepared from 26.72 grams of chromium trioxide, 23 ml. of concentrated sulfuric acid and water to 100 ml. This oxidizing agent is conveniently allowed to act on the compound of Formula VII at a temperature of from −10 to 10° C., preferably at about 0° C. This oxidation can be completed after a few minutes, i.e., after a period of from about 5 to 15 minutes. The reaction mixture can be worked up in a conventional manner such as by pouring the reaction mixture onto ice water and extracting with diethyl ether. The ether extract can then be washed, dried and the ether evaporated therefrom. If desired, the compound of Formula VIII can be purified by adsorption on Kieselgel and eluting with a solvent mixture preferably hexane and ethyl acetate.

On the other hand, the reaction of step (c) can be carried out by treating the compound of Formula VIII with a dehydrogenating agent. Among the preferred dehydrogenating agents are included aluminum tert.-butylate or a benzoquinone substituted by halogen and/or cyano. Among the preferred dehydrogenating agents for use in this invetion is dichlorodicyanobenzoquinone. The conditions which are commonly employed in utilizing these dehydrogenating agents can be utilized carrying out the reaction of step (c).

In a further preferred embodiment the diol obtained is oxidized with manganese dioxide to the desired 1-hydroxy-4-oxo compound of Formula I. In the performance of this reaction step the diol is dissolved in an inert organic solvent, for example methylene chloride, manganese dioxide is added and the mixture is shaken, preferably at room temperature. In a preferred embodiment the mixture is shaken for 24 hours and then worked up in a conventional manner.

The compounds of Formulae V, VI, VII, and VIII above can be respectively converted to the compound of Formulae IX, X, XI, and I-A, by either a Wittig or Horner reaction. In the reactions of steps (d), (e), (f) and (g) the compounds of Formulae V, VI, VII and VIII are reacted with a Wittig reactant of the formula

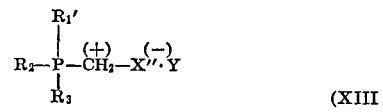

(XIII)

wherein X" is as X' above with the exception of etherified and esterified hydroxymethylene or formyl, and R'$_1$, R$_2$ and R$_3$ are aryl or di-lower alkylamino; and Y is chlorine, bromine or iodine or with a Horner reactant of the formula

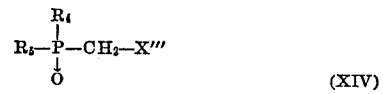

(XIV)

wherein X''' is cayno, carboxy, lower alkoxycarbonyl, lower alkanoyl and R$_4$ and R$_5$ are aryl, aryloxy or lower alkoxy In case a compound of Formulae IX, X, XI or I-A is desired, wherein X' is an etherified or esterified hydroxymethylene or a formyl group, the respective compounds of Formulae XXIII, XXIV, XXV or XX are prepared as described hereinafter and the esterified hydroxymethylene compound obtained may be hydrolyized and, if necessary, etherified or oxidized with manganese dioxide to the formyl derivative in conventional manners.

The Wittig or Horner reactions of steps (d), (e), (f) and (g) can be carried out by conventional means well known in the art. Generally, these reactions are carried out in the presence of an alkali metal base in an inert organic solvent. Any conventional alkali metal base can be utilized. The conventional alkali metal bases include the alkali metal hydrides such as sodium hydride, potassium hydride; alkali metal lower alkoxides such as, sodium methoxide, sodium ethoxide, etc.; and the alkali metal amide bases such as, sodamide, potassium amide, sodium methylamide, potassium methylamide, as well as other alkali metal lower alkyl amides. In carrying out eihter the Horner or Wittig reactions, any conventional inert organic solvent can be utilized. Generally, solvents such as benzene, toluene, tetrahydrofuran, dioxane, N,N-dimethylformamide are preferred. In carrying out either the Horner or Wittig reactions, temperature and pressure are not critical and these reactions can be carried out at room temperature and atmospheric pressure. If desired higher or lower temperatures can be utilized.

The conversion of compounds of the Formula IX to compounds of the Formula X, via reaction step (h) is carried out in the same manner as described in connection with step (a). The conversion of compounds of the Formula X to compounds of the Formula XI via reaction step (i) is carried out in the same manner as described in connection with step (b). The conversion of compounds of the Formula XI to compounds of the Formula I–A via reaction step (j), is carried out in the same manner as described in connection with step (c).

When X' in the compound of the Formula I–A is an esterified hydroxymethylene group, this group can be saponified to the corresponding alcohol by conventional saponifying techniques such as by treatment with a base. Among the preferred bases for carrying out this saponification are included alkali metal lower alkoxides such as sodium methoxide.

When X' in the compound of Formula I–A is an etherified hydroxymethylene group, this group can be converted to the corresponding alcohol by conventional means such as by treating the ether with a concentrated aqueous hydrohalic acid such as hydrogen bromide or hydrogen iodide. This reaction is generally carried out by heating.

When X' in the compound of Formula I–A is a lower alkoxycarbonyl, phenoxycarbonyl, or substituted phenoxycarbonyl, this ester can, if desired, be converted into amide (which may be lower alkyl substituted). This conversion can be carried out, for example, by treating the ester with an appropriate dialkylamine lithium compound. The dialkylamine lithium compound needed for this reaction can expediently be prepared by dissolving a dialkylamine (e.g., diethylamine) in diethyl ether and mixing the resulting solution in the cold (preferably at —10° C. to 20° C.) with a solution of butyl lithium in hexane or tetrahydrofuran and subsequently allowing this mixture to react. The dialkylamine lithium obtained is advantageously reacted with the ester at room temperature.

When X', in the compound of Formula I–A above is lower alkoxy carbonyl, phenoxycarbonyl, or substituted phenoxycarbonyl, these esters can be converted to the corresponding acid by saponification in the manner mentioned hereinbefore. The resulting acids can be converted into acid chlorides by conventional means such as by treatment with thionyl chloride, preferably in the presence of pyridine. The acid halide can be transformed into an ester by reaction with a lower alkanoyl, phenol or a substituted phenol. On the other hand, the acid halide can be transformed into an acid amide by reaction with ammonia, a mono-substituted amine, a di-substituted amine or a cyclic amine such as imidazole, utilizing conventional procedures well known in the art.

In accordance with a preferred embodiment of this invention, an intermediate of the formula

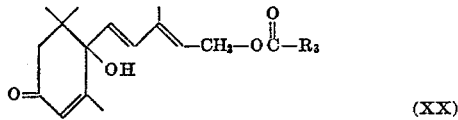

wherein $R_3$ is lower alkyl, halo lower alkyl, aryl or aryl substituted with alkyl, halogen or nitro;

is converted to the compound of Formula I wherein X is hydroxymethyl by hydrolysis. This hydrolysis reaction can take place in the manner hereinbefore described such as by treatment with an alkali. On the other hand, hydrolysis can take place by treatment with an organic or inorganic acid.

The compound of Formula XX is produced by first reacting a compound of the formula:

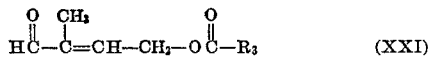

wherein $R_3$ is as above
via a Wittig reaction with a compound of the formula

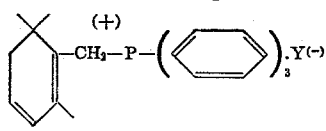

wherein Y is chlorine, bromine or iodine to produce a compound of the formula

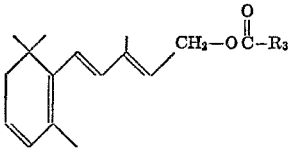

wherein $R_3$ is as above.

This Wittig reaction is carried out in the manner described hereinbefore. The compound of Formula XXIII above is converted to a compound of formula

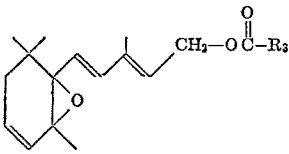

wherein $R_3$ is as above.

by treatment with an organic peroxide in the manner described in connection with step (a). The compound of Formula XXIV is converted to a compound having the formula:

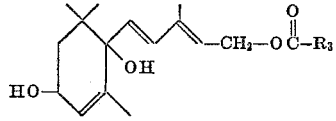

wherein $R_3$ is as above by treatment with selenium dioxide in the manner described in connection with step (b).

The compound of formula XXV is converted to the compound of Formula XX by treatment with an oxidizing agent such as manganese dioxide or any of the other oxidizing agents as described in connection with step (c).

The following examples are illustrative of the invention and are not to be construed as limited thereof. In the examples, all temperatures are in degrees centigrade. The term "concentrated sulfuric acid" as utilized in the examples designates an aqueous solution containing 96% by weight of sulfuric acid. The petroleum ether utilized in these examples had a boiling point of 80–105° C. The term "dilute sulfuric acid" as utilized in the examples is an aqueous solution containing 12% by weight of sulfuric acid.

Example 1

1.5 g. of 4-(1,2-epoxy-2,6,6-trimethyl-cyclohex-3-en-1-yl)-but-3-en-2-one (designated in the following by 5,6-epoxy-3,4-dehydro-β-ionone) are treated with 25 ml. of abs. tetrahydrofuran and, after the addition of 3 g. of pulverized selenium dioxide, shaken with nitrogen gassing for 12 hours. The reaction mixture is thereupon diluted with 100 ml. of diethyl ether and then filtered. The filtrate is successively washed with 0.5 N aqueous sodium hydroxide and water, dried over sodium sulphate and evaporated under reduced pressure to produce 4-(1,4-dihydroxy - 2,6,6 - trimethyl-cyclohex-2-en-1-yl)-but-3-en-2-one as a yellow oil.

Example 2

The yellow oil 4(1,4-dihydroxy-2,6,6-trimethyl-cyclohex-2-en-1-yl)-but-3-en-2-one is taken up in 50 ml. of acetone and subsequently treated at 0° C. with 1.13 ml. of a chromic acid solution (26.72 g. of chromium trioxide, 23 ml. of conc. sulphuric acid, water to 100 ml.). After 5 minutes, the reaction mixture is poured onto ice and extracted with diethyl ether. The ether extract is successively washed with a saturated aqueous sodium bicarbonate solution and with water, dried over sodium sulphate and evaporated under reduced pressure. The residual oily yellow-colored 4 - (1 - hydroxy-2,6,6-trimethyl-4-oxo-cyclohex-2-en-1-yl)-ut-3-en-2-one is purified by adsorption on the 100-fold amount of Kieselgel (eluting agent:hexane/acetic acid ethyl ester 1:2). After recrystallization from benzene/hexane, the compound melts at 112° C.

Example 3

19 g. of 4-(2,6,6-trimethyl-cyclohex-1,3-dien-1-yl)-but-3-en-2-one(3,4-dehydro-β-ionone) are dissolved in 300 ml. of methylene chloride and, with stirring at 3 to 5° C., treated little by little with 23.5 g. of m-chloroperbenzoic acid. The reaction mixture is further stirred at 0° C. for 2 hours, then poured into a mixture of 300 ml. of ice-water and 46 ml. of 3 N aqueous sodium hydroxide The methylene chloride layer is separated off and washed neutral with water. The aqueous phase is exhaustively extracted with diethyl ether. The ether extract obtained, together with the methylene chloride phase, is dried over sodium sulphate and evaporated under reduced pressure. The residual light-yellow colored oily 5,6-epoxy-3,4-dehydro-β-ionone is purified by adsorption on the 50-fold amount of Kieselgel (granule size 0.2–0.5 mm.). (Eluting agent: hexane/acetic acid ethyl ester 7:2 parts by volume.)

Example 4

3.2 g. of 3-methyl-5-(1,2-epoxy-2,6,6-trimethyl-cyclohex-3-en-1-yl) - penta 2 - cis/trans, 4-trans-dien-1-oic acid ethyl ester are introduced into 50 ml. of tetrahydrofuran and, after the addition of 6.4 g. of selenium dioxide shaken at room temperature for 48 hours. The reaction mixture is thereupon diluted with 150 ml. of diethyl ether and filtered clear. The ethereal solution is washed three times with cold 0.5 N aqueous sodium hydroxide and subsequently three times with water, dried over sodium sulphate and evaporated under reduced pressure. There resulted 3-methyl-5-(1,4-dihydroxy-2,6,6-trimethylcyclohex-2-en-1-yl) - penta-2-cis/trans, 4-trans-dien-1-oic acid ethyl ester as a yellow oil.

Example 5

3.4 g. of 3-methyl-5-(1,4-dihydroxy - 2,6,6 - trimethyl-cyclohex-2-en-1-yl) - penta - 2 - cis/trans, 4-trans-dien-1-oic acid ethyl ester are dissolved in 100 ml. of acetone and treated at 0° C. with 4.33 ml. of a chromic acid solution (26.72 g. of chromium trioxide, 23 ml. of conc. sulphuric acid, water to 100 ml.). After 5 minutes, the reaction mixture is poured onto ice and extracted with diethyl ether. The ether phase is washed with saturated aqueous sodium bicarbonate solution then with water, dried over sodium sulphate and evaporated under reduced pressure. The residual dark-yellow oily 3-methyl-5-(1-hydroxy-2,6,6-trimethyl-4-oxo-cyclohex-2-en-1-yl) - penta-2-cis/trans, 4-trans-dien-1-oic acid ethyl ester can subsequently be saponified as follows without further purification.

Example 6

After the addition of a solution of 10 g. of potassium hydroxide in 70 ml. of methanol and 30 ml. of water, 2.9 g. of 3-methyl-5-(1-hydroxy-2,6,6-trimethyl - 4 - oxo-cyclohex-2-en-1-yl)penta-2-cis/trans, 4 - trans-dien-1-oic acid ethyl ester are stirred at room temperature for 24 hours. The reaction mixture is subsequently concentrated under reduced pressure. The concentrate is taken up in water and extracted with diethyl ether. The aqueous phase is slightly acidified with dilute sulphuric acid and again extracted with diethyl ether. The last-obtained ether extract is washed three times with water, decolorized with the aid of active charcoal, dried over sodium sulphate and treated with high-boiling petroleum ether up to incipient crystallization. The 3-methyl-5-(1-hydroxy-2,6,6-trimethyl - 4 - oxo - cyclohex-2-en-1-yl) - penta - 2 - cis-4-trans-dien-1-oic acid which precipitates melts at 185–186° C.

Example 7

3.85 g. of sodium hydride (50% by weight suspension in mineral oil) are overlaid with 150 ml. of abs. dioxan and treated dropwise at 10° C. with 31 g. of di(2-chlorophenyl)-ethoxy-carbonyl - methyl - phosphine oxide. The mixture is stirred at room temperature for 30 minutes, then again cooled to 10° C. and treated dropwise with a solution of 15 g. of 5,6-epoxy - 3,4 - dehydro-β-ionone (manufactured according to Example 3) in 20 ml. of dioxan. The reaction mixture is stirred at room temperature for 12 hours, and after decomposition of the excess sodium hydride by cautious addition of ethanol, poured into an ice/sodium chloride mixture and exhaustively extracted with diethyl ether. The ether extract is washed with water, dried over sodium sulphate and evaporated under reduced pressure. The residual yellow, oily 3-methyl - 5 - (1,2 - epoxy-2,6,6-trimethyl-cyclohex-3-en-1-yl)-penta-2-cis/trans, 4-trans-dien-1-oic acid ethyl ester is purified by adsorption on the 80-fold amount of Kieselgel (eluting agent: hexane/acetic acid ethyl ester 7:1 parts by volume). B.P. about 165° C./0.05 mm. Hg.

Example 8

6 g. of 3-methyl-5-(1,2-epoxy-2,6,6-trimethyl-cyclohex-3-en-1-yl)-penta-2-cis, 4-trans-dien-1-oic acid methyl ester are dissolved in 125 ml. of dioxan and, after the addition of 5 g. of pulverized selenium dioxide, stirred at room temperature for 50 hours. The reaction solution is filtered clear. The filtrate is diluted with 250 ml. of hexane and, after the addition of 6.2 g. of mercury (II) chloride, intensively stirred in 150 ml. of water for 5 hours. The mixture is subsequently filtered. The filtrate is diluted with diethyl ether, washed neutral with water, dried over sodium sulphate and evaporated under reduced pressure. The residual isomer mixture consisted of 3-methyl-5-(1,4-cis-dihydroxy - 2,6,6 - trimethyl-cyclohex-2-en-1-yl)-penta-2-cis, 4 - trans - dien-1 oic acid methyl ester and 3-methyl-5-(1,4-trans-dihydroxy - 2,6,6 - trimethyl-cyclohex-2-en-1-yl)-penta - 2 - cis, 4-trans-dien-1-oic acid methyl ester.

Example 9

6.3 g. of the isomer mixture of 3-methyl-5-(1,4-cis/trans-dihydroxy - 2,6,6 - trimethyl-cyclohex-2-en-1-yl)-penta-2-cis, 4-trans-dien1-oic acid methyl ester are dissolved in 150 ml. of acetone and treated at 0° C. with 8.45 ml. of a chromic acid solution (26.72 g. of chromium trioxide, 23 ml. of conc. sulphuric acid, water to 100 ml.). After 10 minutes, the reaction mixture is poured onto ice and extracted with diethyl ether. The ether extract is washed with a saturated aqueous sodium bicarbonate solution and with water, dried over sodium sulphate and evaporated. The residual yellow oily 3-methyl-5-(1 - hydroxy - 2,6,6 - trimethyl-4-oxocyclohex-2-en-1-yl)-penta-2-cis, 4 - trans-dien-1-oic acid methyl ester is purified by adsorption on the 40-fold amount of Kieselgel eluting agent: hexane/acetic acid ethyl ester 1:1 parts by volume). After recrystallization from high-boiling petroleum ether with the addition of a little diethyl ether, the ester melts at 96° C.

Example 10

After the addition of a solution of 6 g. of potassium hydroxide in 45 ml. of methanol and 15 ml. of water, 1.8 g. of 3-methyl-5-(1-hydroxy-2,6,6-trimethyl-4-oxo-cyclohex-2-n-1-yl)-penta-2-cis, 4-trans-dien-1-oic acid methyl ester are stirred at room temperature for 12 hours. The reaction mixture is thereupon diluted with water. The aqueous phase is exhaustively extracted with diethyl ether. The water phase is slightly acidified with dilute aqueous sulphuric acid and extracted with diethyl ether. The last-obtained ether extract is washed three times with water, dried over sodium sulphate and evaporated under reduced pressure. The residual 3-methyl-5-(1-hydroxy-2,6,6 - trimethyl-4-oxo-cyclohex-2-en-1-yl)-penta-2-cis, 4- transdien-1-oic acid melts at 187–188° C. after recrystallization from hexane/diethyl ether.

Example 11

6 g. of 3-methyl-5-(2,6,6-trimethyl-cyclohexa-1,3-dien-1-yl)-penta-2-cis, 4-trans-dien-1-oic acid methyl ester [prepared from di(2-chlorophenyl)-methoxycarbonyl-methyl-phosphine oxide and 5,6-epoxy-3,4-dehydro-β-ionone as described in Example 9] are dissolved in 60 ml. of methylene chloride and treated dropwise at 0° C. with a solution of 5.3 g. of m-chloro-perbenzoic acid in 60 ml. of methylene chloride. The reaction mixture is further stirred at 0° C. for 90 minutes, then poured into a mixture of ice and 10 ml. of 3 N aqueous sodium hydroxide. The methylene chloride layer is separated off, washed with water, dried over sodium sulphate and evaporated under reduced pressure. The residual yellow, oily 3-methyl-5-(1,2-epoxy-2,6,6-trimethyl-cyclohex-3-en-1-yl)-penta-2-cis, 4-trans-1-oic acid methyl ester can be purified by adsorption on the 40-fold amount of Kieselgel (eluting agent:hexane/acetic acid ethyl ester 9:1).

Example 12

29 g. of 3-methyl-5-(2,6,6-trimethyl-cyclohexa-1,3-dien-1-yl)-penta-2,4-dien-1-al was dissolved in 50 ml. of methylene chloride and at 0° 2.3 g. of m-chloroperbenzoic acid were added. The temperature rose to 8°. The reaction mixture was allowed to stand at 0° for 1 hour and then poured onto ice and 5 ml. of 3 N aqueous sodium hydroxide. After extraction with ether, the organic phase was washed with water, dried and evaporated to dryness. The crude product was chromatographed on 40-fold amount of aluminum oxide [neutral, activity grade III (Woelm) with hexane/acetic acid ethyl ester (6:1)].

The crude, light yellow oil was used directly for the next step as described in Examples 1, 4 and 14.

Example 13

By the procedure of Examples 1, 2 and 3:

3-methyl-5-(2,6,6 - trimethyl-cyclohexa - 1,3-dien-1-yl)-penta-2,4-dien-1-oic acid n-pentyl ester is converted to 3 - methyl-5-(1,2-epoxy-2,6,6-trimethyl-cyclohex-3-en-1-yl)-penta-2,4-dien-1-oic acid n-pentyl ester, which then is converted to 3-methyl-5-(1-hydroxy-2,6,6-trimethyl - 4-oxo-cyclohex-2-en-1-yl)-penta-2,4-dien-1-oic acid n-pentyl ester (oil);

3 - methyl - 5 - (2,6,6-trimethyl-cyclohexa-1,3-dien-1-yl)-penta-2,4-dien-1-oic acid phenyl ester is converted to 3-methyl - 5-(1,2-epoxy-2,6,6-trimethyl-cyclohex-3-en-1-yl)-penta-2,4-dien-1-oic acid phenyl ester which then is converted to 3-methyl-5-(1-hydroxy-2,6,6-trimethyl-4-oxo-cyclohex-2-en-1-yl)-penta-2,4-dien-1-oic acid phenyl ester (M.P. 146–147° C.);

3-methyl - 5 - (2,6,6-trimethyl-cyclohexa-1,3-dien-1-yl)-penta-2,4-dien-1-oic acid p-nitrophenyl ester is converted to 3-methyl-5-(1,2-epoxy-2,6,6-trimethyl-cyclohex-3-en-1-yl)-penta-2,4-dien-1-oic acid p-nitrophenyl ester which then is converted to 3-methyl-5-(1-hydroxy-2,6,6-trimethyl - 4 - oxo-cyclohex-2-en-1-yl)-penta-2,4-dien-1-oic acid p-nitrophenyl ester (M.P. 158–163° C.);

3 - methyl - 5 - (2,6,6-trimethyl-cyclohexa-1,3-dien-1-yl)-penta-2,4-dien-1-oic acid p-methyl sulfonyl-phenyl ester is converted to 3-methyl-5-(1,2-epoxy-2,6,6-trimethyl-cyclohex-3-en-1-yl)-penta-2,4-dien-1-oic acid p-methyl sulfonyl-phenylester which then is converted to 3 - methyl-5-(1-hydroxy-2,6,6-trimethyl-4-oxo-cyclohex-2-en-1-yl)-penta-2,4-dien-1-oic acid-p-methyl, sulfonyl-phenylester (M.P. 161–166° C.);

3 - methyl - 5 - (2,6,6-trimethyl-cyclohexa-1,3-dien-1-yl)-penta-2,4-dien-1-oic acid-nitrile is converted to 3-methyl-5-(1,2-epoxy - 2,6,6 - trimethyl-cyclohex-3-en-1-yl)-penta-2,4-dien-1-oic acid-nitrile which then is converted to 3 - methyl-5-(1-hydroxy-2,6,6-trimethyl-4-oxo-cyclohex-2-en-1-yl)-penta-2,4-dien-1-oic acid-nitrile (M.P. 172–173° C.);

1 - benzoyl - 3 - methyl-5-(2,6,6-trimethyl-cyclohexa-1,3-dien-1-yl)-penta-2,4-dien is converted to 1-benzoyl-3-methyl - 5 - (1,2-epoxy-2,6,6-trimethyl-cyclohex-3-en-1-yl)-penta-2,4-diene which then is converted to 1-benzoyl - 3-methyl-5-(1-hydroxy-2,6,6-trimethyl-4-oxo-cyclohex-2-en-1-yl)-penta-2,4-dien (oil);

3 - methyl - 5 - (2,6,6-trimethyl-cyclohexa-1,3-dien-1-yl)-penta-2,4-dien-1-oic acid-imidazolide is converted to 3-methyl - 5 - (1,2-epoxy-2,6,6-trimethyl-cyclohex-3-en-1-yl)-penta-2,4-dien-1-oic acid-imidazolide which then is converted to 3-methyl-5-(1-hydroxy-2,6,6-trimethyl-4-oxo-cyclohex-2-en-1-yl)-penta-2,4-dien-1-oic acid-imidazolide (M.P. 165–175° C.); and 3 - methyl - 5 - (2,6,6-trimethyl-cyclohexa-1,3-dien-1-yl)-penta-2,4-dien-1-al is converted to 3-methyl-5-(1,2-epoxy - 2,6,6 - trimethyl-cyclohex-3-en-1-yl)-penta-2,4-dien-1-al which then is converted to 3-methyl-5-(1-hydroxy - 2,6,6-trimethyl-4-oxo-cyclohex-2-en-1-yl)-penta-2,4-dien-1-al (M.P. 113–115° C.).

Example 14

In 60 ml. of tetrahydrofuran, there was dissolved 2.8 g. of 3-methyl-5-(1,2-epoxy-2,6,6-trimethyl-cyclohex-3-en-1-yl)-penta-2,4-dienyl acetate. After the addition of 6.5 g. of selenium dioxide, the mixture was allowed to stand for 45 hours at room temperature. After this period, the reaction mixture was diluted with 150 ml. of diethyl ether and filtered. The ether solution was washed 3 times with 0.5 N aqueous sodium hydroxide and then 3 times with water. The reaction mixture was then dried over sodium sulfate and then evaporated under vacuum. After evaporation, there resulted 3 - methyl-5-(1,4'-dihydroxy-2,6,6-trimethyl-cyclohex-2-en-1-yl)-penta-2,4-dienyl acetate as a crude oil.

Example 15

In 100 ml. of methylene chloride there was dissolved 3 g. of 3-methyl-5-(1,4-dihydroxy-2,6,6-trimethyl-cyclohex-2-en-1-yl)-penta-2,4-dienyl acetate and 30 g. of manganese dioxide. The resulting reaction mixture was shaken for 24 hours at room temperature. After this period, the reaction mixture was filtered and then evaporated to dryness under vacuum. From the resulting oily product, 3 - methyl - 5 - (1-hydroxy-2,6,6-trimethyl-4-oxo-cyclohex-2-en-1-yl)-penta-2-cis-4-trans-dienyl acetate was obtained. This product was obtained in crystalline form by fractional crystallization from a mixture of hexane and diethyl ether. The resulting product had a melting point of 100–101° C.

Example 16

In 20 ml. of methanol, there was dissolved 2 g. of 3 - methyl - 5 - (1-hydroxy-2,6,6-trimethyl-4-oxo-cyclohex-2-en-1-yl)-penta-2-cis-4-trans-dienyl acetate. After the addition of 15 g. of sodium hydroxide in 5 ml. of water to the solution, the reaction mixture was allowed to stand for one hour at room temperature under constant stirring. After this, 100 ml. of water were added to the solution and the solution was extracted with diethyl ether. The resulting ether solution was washed neutral with water and then dried by evaporation under vacuum. From the residue, the product 3-methyl-5-(1-hydroxy-2,6,6-trimethyl-4 - oxo - cyclohex-2-en-1-yl)-penta-2-cis-4-trans-dien-1-ol was crystallized utilizing a mixture of hexane and acetic acid ethyl ester. The product had a melting point of 126–128° C.

Example 17

50 g. of 3,4-dehydro-cyclogeranyl-triphenyl phosphonium bromide, which was obtained by reacting equimolar amounts of 3,4-dehydro-cyclogeranyl bromide (1-bromomethyl-2,6,6-trimethylcyclohexa-1,3-diene) with triphenyl phosphine, was dissolved in 250 ml. of dimethyl formamide. To the resulting solution there was added a solution containing 2.3 g. of sodium in 75 ml. of absolute alcohol. After the sodium ethoxide solution was added, 14 g. of 3-formyl-2-butenyl acetate in 20 ml. of dimethyl formamide was added to the reaction mixture. The resulting reaction mixture was stirred for 5 hours at 0° C. and then acidified with a dilute sulfuric acid solution. There resulted a light yellow oily suspension which was extracted with hexane. The hexane extract was washed neutral with water and then dried over sodium sulfate. The solvent was removed from the reaction medium by evaporation ultilizing vacuum. After evaporation, a light oil resulted. This oil was purified by adsorption on Kieselgel and eluting with benzene. The resulting product was 3 - methyl - 5 - (2,6,6-trimethyl-cyclohexa-1,3-diene-1-yl)-penta-2,4-dienyl acetate.

Example 18

In 200 ml. of methylene chloride there was dissolved 12 g. of 3-methyl-5-(2,6,6-trimethyl-cyclohexa-1,3-dien-1-yl)-penta-2,4-dienyl acetate. The resulting solution was cooled to 0° C. At this temperature 5.6 g. of m-chloroperbenzoic acid was added portionwise. The reaction mixture was allowed to stand for 60 minutes at 0° C. under constant stirring and poured on a mixture of ice and 20 ml. of 3 N aqueous sodium hydroxide. After this period, the methylene chloride phase was separated and washed with water. After washing, this phase was dried over sodium sulfate and evaporated under reduced pressure. After evaporation there resulted 3-methyl-5-(1,2-epoxy-2,6,6-trimethyl-cyclohex-3-en-1-yl)-penta-2,4-dienyl acetate as a yellow oil. This yellow oil was purified by adsorption on a 50 fold amount of Kieselgel (eluting agent: hexane/acetic acid ethyl ester 10:1 parts by volume).

Example 19

In the manner of Examples 18, 14 and 15:

3 - methyl - 5 - (2,6,6-trimethyl-cyclohexa-1,3-dien-1-yl)-penta-2,4-dienyl benzoate was converted to 3-methyl-5-(1,2-epoxy-2,6,6-trimethyl-cyclohex-3-en-1-yl) - penta-2,4-dienyl benzoate which then was converted to 3 - methyl-5-(1-hydroxy-2,6,6-trimethyl-4-oxo-cyclohex-2-en-1-yl)-penta-2,4-dienyl benzoate (M.P. 105°);

3 - methyl - 5 - (2,6,6-trimethyl-cyclohexa-1,3-dien-1-yl)-penta-2,4-dienyl-2',4'-dinitro benzoate was converted to 3-methyl-5-(1,2-epoxy-2,6,6-trimethyl-cyclohex-3-en-1-yl)-penta-2,4-dienyl-2',4'-dinitro benzoate which then was converted to 3-methyl-5-(1-hydroxy-2,6,6-trimethyl-4-oxo-cyclohex-2-en-1-yl)-penta-2,4-dienyl-2',4' - dinitro benzoate (M.P. 130–131°);

3 - methyl - 5 - (2,6,6-trimethyl-cyclohexa-1,3-dien-1-yl)-penta-2,4-dienyl naphthoate was converted to 3-methyl-5-(1,2-epoxy-2,6,6-trimethyl-cyclohex-3-en-1-yl)-penta-2,4-dienyl naphthoate which then was converted to 3 - methyl-5-(1-hydroxy-2,6,6-trimethyl-4-oxo-cyclohex-2 - en-1-yl)-penta-2,4-dienyl naphthoate (M.P. 126–127°);

3 - methyl - 5 - (2,6,6-trimethyl-cyclohexa-1,3-dien-1-yl)-penta-2,4-dienyl-4'-methyl benzoate was converted to 3 - methyl-5-(1,2-epoxy-2,6,6-trimethyl-cyclohex-3-en-1-yl)-penta-2,4-dienyl-4'-methyl benzoate which then was converted to 3-methyl-5-(1-hydroxy-2,6,6-trimethyl-4-oxo-cyclohex-2-en-1-yl)-penta-2,4-dienyl-4'-methyl benzoate (M.P. 119°);

3 - methyl - 5 - (2,6,6-trimethyl-cyclohexa-1,3-dien-1-yl)-penta-2,4-dienyl-4'-chloro benzoate was converted to 3 - methyl-5-(1,2-epoxy-2,6,6-trimethyl-cyclohex-3-en-1-yl)-penta-2,4-dienyl-4'-chloro benzoate which then was converted to 3-methyl-5-(1-hydroxy-2,6,6-trimethyl-4-oxo-cyclohex-2-en-1-yl)-penta-2,4-dienyl-4'-chloro benzoate (M.P. 123°);

3 - methyl - 5 - (2,6,6-trimethyl-cyclohexa-1,3-dien-1-yl)-penta-2,4-dienyl-4'-nitro benzoate was converted to 3 - methyl-5-(1,2-epoxy-2,6,6-trimethyl-cyclohex-3-en-1-yl)-penta-2,4-dienyl-4'-nitro benzoate which then was converted to 3-methyl-5-(1-hydroxy-2,6,6-trimethyl-4-oxo - cyclohex-2-en-1-yl)-penta-2,4-dienyl-4'-nitro benzoate (M.P. 135–136°);

3 - methyl - 5 - (2,6,6-trimethyl-cyclohexa-1,3-dien-1-yl)-penta-2,4-dienyl-chloro acetate was converted to 3-methyl - 5 - (1,2-epoxy-2,6,6-trimethyl-cyclohex-3-en-1-yl)-penta-2,4-dienyl-chloro acetate which then was converted to 3-methyl-5-(1-hydroxy-2,6,6-trimethyl-4-oxo-cyclohex - 2 - en-1-yl)-penta-2,4-dienyl-chloro acetate (M.P. 99–100°).

Example 20

All of the products in Example 19 were utilized by the procedure of Example 16 to produce 3-methyl-5-(1-hydroxy - 2,6,6 - trimethyl-4-oxo-cyclohex-2-en-1-yl)-penta-2,4-dien-1-ol.

We claim:
1. A compound of the formula

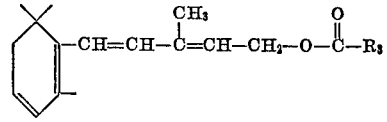

wherein $R_3$ is lower alkyl, halo-substituted lower alkyl, hydrocarbon aryl or hydrocarbon aryl substituted with lower alkyl, halogen or nitro.

2. The compound of claim 1 wherein said compound is 3 - methyl - 5 - (2,6,6-trimethyl-cyclohexa-1,3-dien-1-yl)-penta-2,4-dienyl acetate.

References Cited

Chem. Abstracts, 73:88039k.

VIVIAN GARNER, Primary Examiner

U.S. Cl. X.R.

260—309, 348 A, 348 C, 464, 468 R, 469, 470, 471 R, 476 R, 487, 488 H, 491, 514 R, 586 R, 589, 592, 598